United States Patent

[11] 3,542,405

[72] Inventor Edward C. Nalodka
    Allen Park, Michigan
[21] Appl. No. 802,523
[22] Filed Feb. 26, 1969
[45] Patented Nov. 24, 1970
[73] Assignee Ford Motor Company
    Dearborn, Michigan
    a corporation of Delaware

[54] TUBULAR COUPLING
    2 Claims, 4 Drawing Figs.
[52] U.S. Cl. .................................................. 285/158,
    285/347, 285/417, 285/423
[51] Int. Cl. .................................................... F16l 3/04
[50] Field of Search .......................................... 285/158,
    192, 347, 369, 364, 372, 177, 406, 417, 418, 423,
    S.F.

[56] References Cited
    UNITED STATES PATENTS
2,398,399  4/1946  Alexander .................... 285/233X

| | | | |
|---|---|---|---|
| 2,550,591 | 4/1951 | Parsons ........................ | 285/406X |
| 3,319,980 | 5/1967 | Demetriff et al .............. | 285/158X |
| 3,394,954 | 7/1968 | Sarns ............................ | 285/347X |
| | | FOREIGN PATENTS | |
| 1,303,105 | 7/1962 | France ......................... | 285/369 |
| 870,684 | 3/1953 | Germany ...................... | 285/372 |
| 604,573 | 7/1948 | Great Britain ................ | 285/417 |
| 376,732 | 5/1964 | Switzerland .................. | 285/S.F. |
| 164,908 | 12/1905 | Germany ..................... | 285/399 |

Primary Examiner—Dave W. Arola
Attorney—John R. Faulkner and Roger E. Erickson

ABSTRACT: A tubular coupling which includes a pair of telescopingly joined tube portions each having an enlarged portion protruding radially outwardly from the normal diameter of the tube portion, and an elastically deformable retaining means that fits about the tubular portions and axially encloses the enlarged portion thereby maintaining the axial connection of the tube portions.

Patented Nov. 24, 1970
3,542,405
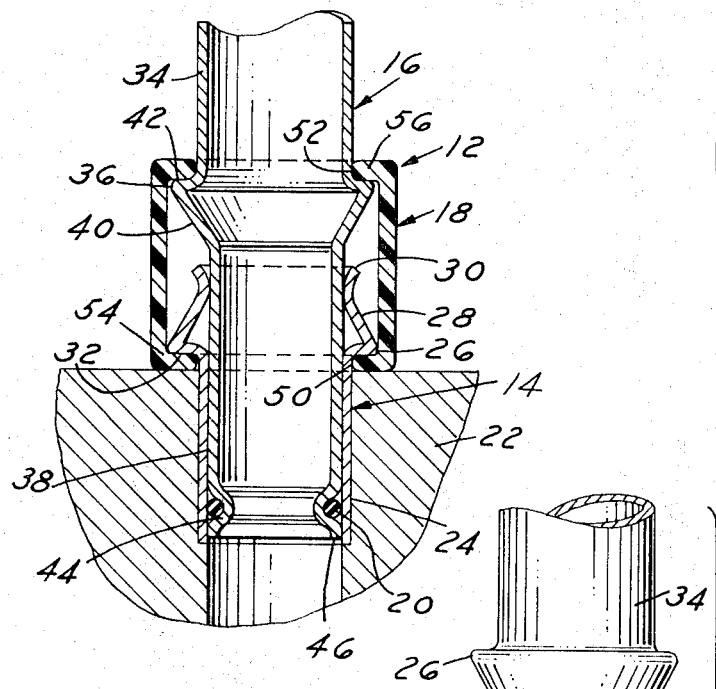
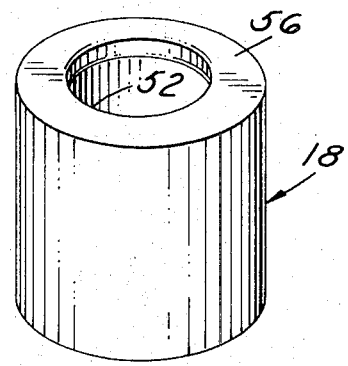
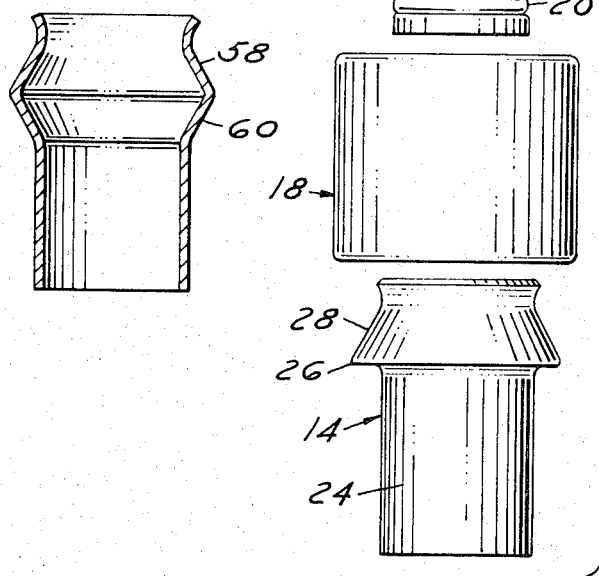
INVENTOR
EDWARD C. NALODKA
BY JOHN R. FAULKNER
ROGER E. ERICKSON
ATTORNEYS

TUBULAR COUPLING

BACKGROUND OF THE INVENTION

A conventional tube coupling generally includes a female fitting threadedly engaging a male fitting. The coupling seal is dependent on the magnitude of torque applied to the coupling during its assembly. If the torque applied is insufficient the coupling will not seal properly. If the torque applied is excessive, the coupling will be damaged.

This invention provides a tubular coupling which includes no threaded elements and in which the seal is not dependent on the torque applied to the elements. The invention also provides a tubular coupling in which male and female tube portions may be joined by simply inserting the male tube portion into the female tube portion and positioning a deformable retaining means about the junction. Furthermore, this invention provides a tubular coupling particularly suited for mass production applications which is both economical to manufacture and reliable in operation.

BRIEF SUMMARY OF THE INVENTION

A tubular coupling constructed in accordance with this invention includes a first tube portion having an open end and a second tube portion also having an open end and being telescopically received within the open end of the first tube portion. An enlarged portion is formed on the first tube portion protruding radially outwardly adjacent its open end. A second enlarged portion is formed on the second tube portion which also protrudes radially outwardly and is spaced apart from its open end. An elastically deformable retaining means is positioned about the telescoping tube portions and has two end openings between which are situated the first and second enlarged portions. One of the end openings receives the first tube portion and is smaller than the first enlarged portion. The other end opening receives the second tube portion and is smaller than the second enlarged portion. The coupling can neither be assembled or disassembled without elastic deformation of the retaining means.

BRIEF DESCRIPTION OF THE DRAWINGS

FIG. 1 is a cross-sectional view of a tubular coupling assembly constructed in accordance with this invention.

FIG. 2 is a perspective view of retaining means 18.

FIG. 3 is an exploded elevational view of the elements of the tubular coupling assembly of FIG. 1.

FIG. 4 illustrates an alternative construction of a tube portion of a coupling assembly.

DETAILED DESCRIPTION OF A PREFERRED EMBODIMENT

FIG. 1 illustrates the preferred embodiment of the applicant's invention. The tubular coupling assembly 12 comprises four elements: a first tube portion 14, a second tubular member 16 telescopingly received within the first tubular member, an elastically deformable retaining means 18 to hold the first and second members in a connected position and a sealing means 20 between the first and second tubular portions.

The first tube portion 14 is shown in FIG. 1 as press-fitted into a body 22 such as a valve housing. Portion 14 includes a generally cylindrical wall portion 24 and an enlarged portion 26. The enlarged portion 26 includes a conical ramp portion 28 which increases in radius as the axial distance from the tube opening 30 increases. An annular abutment portion 32 interconnects the ramp portion 28 and the cylindrical portion 24. The tube wall adjacent opening 30 is slightly flared to facilitate insertion of the second tube portion 16.

The second tube portion 16 includes a generally cylindrical wall portion 34, an enlarged portion 36 and a nose portion 38. The nose portion 38 has an outside diameter essentially equal to the inside diameter of the cylindrical portion 24 of the first tube portion 14 and is slidably received therein. The outer diameter of wall portion 34 is substantially equal to that of wall portion 24 of tube portion 14. The enlarged portion 36 includes a conical ramp portion 40 which increases in radius as the axial distance from the nose portion 38 increases. An annular abutment portion 42 interconnects the ramp portion 40 and the cylindrical portion 24. An annular groove 44 is formed in the nose portion 38 adjacent its open end 42. The O-ring seal 20 is positioned within the groove 44 and seals the connection between the first and second tube portions 14 and 16.

The retaining means 18 is preferably of a molded plastic construction and has a generally cylindrical shape of a diameter sufficient to accommodate the enlarged portions 26 and 36. Two circular holes 50 and 52 are formed within the axial ends 54 and 56 of the retaining means 18. The inside diameter of the holes 50 and 52 is approximately equal to the outside diameter of the cylindrical wall portions 24 and 34 of tube portions 14 and 16. The holes 50 and 52 must be elastically deformed by the ramps 28 and 40 in order to couple the tube portions 14 and 16. When assembled the ends 54 and 56 of retaining means 18 abut means 32 and 42 to maintain the connection of tube portions 14 and 16.

The coupling may be assembled by pressing the retaining means 18 over the enlarged portion 26 of tube portion 14 so that end 54 engages abutment means 32 as shown in FIG. 1. The nose portion 38 of tube portion 16 is then inserted through the retaining means 18 into tube portion 14. Tube portions 14 and 16 are telescoped together until end 56 passes over enlarged portion 36 and engages abutment means 42. The two tube portions are thus held axially together by the ends 54 and 56 of retaining means 18 as shown in FIG. 1. A substantial axial force tending to separate the tube portions will cause retaining means 18 to deform and thus permit uncoupling of the assembly.

An alternate construction for a tube portion is shown in FIG. 4. The tube portion 58 is formed with a pair of conical ramp portions 58 and 60 which facilitate the uncoupling as well as coupling of the assembly. This alternate construction would be used in applications where it is desirable to disconnect the coupling frequently without replacing the retaining means 18 before reconnection.

The description presents the presently preferred embodiments of the invention. Modifications and alterations will occur to those skilled in the art that are included within the scope and spirit of the invention.

I claim:

1. A tubular coupling comprising:
   a first tube portion having an open end;
   a second tube portion having an open end being telescopically received within said first tube portion;
   said first tube portion having a first enlarged portion extending radially outwardly adjacent its open end;
   said second tube portion having a second enlarged portion extending radially outwardly and being spaced apart from its open end;
   said first and second enlarged portions being generally annular in shape;
   an elastically deformable retaining means positioned about said tube portions and enclosing said enlarged portions;
   said retaining means having a generally cylindrical shape and two generally circular end openings, one of said openings receiving said first tube portion, the other of said openings receiving said second tube portion, said one opening being approximately equal to the normal diameter of said first tube portion and smaller than the first enlarged portion, said other opening being approximately equal to the normal diameter of said second tube portion and smaller than the second enlarged portion;
   said first enlarged portion and said second enlarged portion situated between said end openings when said coupling is assembled;
   said first enlarged portion comprising a generally conical surface increasing in radius from said first tube open end, a generally plane surface interconnecting the maximum radius portion of said generally conical surface and the remainder of said first tube portion;

said second enlarged portion comprising a generally conical surface increasing in radius in the direction away from said second tube open end, a generally plane surface interconnecting the maximum radius portion of said generally conical surface and a remainder of said second tube portion;

a radially outwardly opening annular groove formed in said second tube portion between said raised portion and said open end of said second tube portion; and an O-ring seal positioned within said groove and sealingly engaging said groove and an inside diameter of said first tube portion.

2. A tubular coupling comprising:

a first tube portion having an open end;

a second tube portion having an open end being telescopically received within said first tube portion;

said first tube portion having a first enlarged portion extending radially outwardly adjacent its open end;

said second tube portion having a second enlarged portion extending radially outwardly and being spaced apart from its open end;

said first and second enlarged portions being generally annular in shape;

an elastically deformable retaining means positioned about said tube portions and enclosing said enlarged portions;

said retaining means having a generally circular shape and two generally circular end openings, one of said openings receiving said first tube portion, the other of said openings receiving said second tube portion, said one opening being approximately equal to the normal diameter of said first tube portion and smaller than the first enlarged portion, said other opening being approximately equal to the normal diameter of said second tube portion and smaller than the second enlarged portion;

said first enlarged portion and said second enlarged portion situated between said end openings when said coupling is assembled;

one of said enlarged portions comprising generally double conical surfaces having common major radii;

a radially outwardly opening annular groove formed in said second tube portion between said raised portion and said open end of said second tube portion; and an O-ring seal positioned within said groove and sealingly engaging said groove and an inside diameter of said first tube portion.